US009976475B2

(12) United States Patent
Nowak et al.

(10) Patent No.: US 9,976,475 B2
(45) Date of Patent: May 22, 2018

(54) TURBOCHARGER HAVING A WASTE-GATE VALVE

(71) Applicant: PIERBURG GMBH, Neuss (DE)

(72) Inventors: Martin Nowak, Leverkusen (DE); Michael-Thomas Benra, Castrop-Rauxel (DE); Michael Sanders, Kaarst (DE); Stefan Rothgang, Rheinberg (DE)

(73) Assignee: PIERBURG GMBH, Neuss (DE)

( * ) Notice: Subject to any disclaimer, the term of this patent is extended or adjusted under 35 U.S.C. 154(b) by 76 days.

(21) Appl. No.: 15/309,207

(22) PCT Filed: Feb. 19, 2015

(86) PCT No.: PCT/EP2015/053497
§ 371 (c)(1),
(2) Date: Nov. 7, 2016

(87) PCT Pub. No.: WO2015/169460
PCT Pub. Date: Nov. 12, 2015

(65) Prior Publication Data
US 2017/0074158 A1 Mar. 16, 2017

(30) Foreign Application Priority Data
May 9, 2014 (DE) .................. 10 2014 106 513

(51) Int. Cl.
*F02B 37/18* (2006.01)
*F16K 31/04* (2006.01)
(Continued)

(52) U.S. Cl.
CPC .............. *F02B 37/186* (2013.01); *F01P 3/20* (2013.01); *F02B 39/00* (2013.01); *F16K 31/04* (2013.01);
(Continued)

(58) Field of Classification Search
CPC ......... F01P 3/20; F01P 2060/12; F02B 37/18; F02B 37/186; F02B 37/183
See application file for complete search history.

(56) References Cited

U.S. PATENT DOCUMENTS

2003/0185672 A1* 10/2003 Suganami ............. F02B 37/186
415/150
2007/0199318 A1* 8/2007 Wood .................. F02B 29/0475
60/599
(Continued)

FOREIGN PATENT DOCUMENTS

DE 10 2008 004 688 A1 7/2009
DE 10 2008 014 609 A1 9/2009
(Continued)

OTHER PUBLICATIONS

J. Hintze et al.: "Maschinenelemente, Baugruppen und ihre Montage", Lehrbuch Für Die Berufsbildung, English Translation, relevant part marked on p. 109, pp. 108-112 (1982).

*Primary Examiner* — Patrick Maines
(74) *Attorney, Agent, or Firm* — Norman B. Thot

(57) ABSTRACT

A turbocharger includes a waste gate valve, a compressor, a turbine, a turbine housing which houses the turbine, a bypass channel which bypasses the turbine, a bypass channel section arranged in the turbine housing, an actuator housing which has a separate coolant channel, an electric motor arranged in the actuator housing, a transmission which has an output shaft, a control body coupled to the output shaft, and an actuator cover. The transmission is arranged in the actuator housing. The actuator housing is detachably secured to the turbine housing. The control body controls an opening cross-section of the bypass channel. The separate coolant channel of the actuator housing surrounds a circumference of the transmission and is closed axially by the actuator cover.

13 Claims, 4 Drawing Sheets

(51) Int. Cl.
*F02B 39/00* (2006.01)
*F01P 3/20* (2006.01)
(52) U.S. Cl.
CPC ......... *F01P 2060/12* (2013.01); *Y02T 10/144* (2013.01)

(56) References Cited

U.S. PATENT DOCUMENTS

| | | | | |
|---|---|---|---|---|
| 2008/0298953 | A1* | 12/2008 | Harris | F02B 37/186 |
| | | | | 415/144 |
| 2010/0024414 | A1* | 2/2010 | Hittle | F02M 26/22 |
| | | | | 60/602 |
| 2010/0043429 | A1* | 2/2010 | Wolk | F02B 37/18 |
| | | | | 60/602 |
| 2010/0129205 | A1* | 5/2010 | Schwerdel | F02B 37/16 |
| | | | | 415/148 |
| 2012/0171059 | A1* | 7/2012 | Love | F02B 37/186 |
| | | | | 417/410.1 |
| 2012/0267969 | A1 | 10/2012 | Iwamoto et al. | |
| 2012/0285411 | A1 | 11/2012 | Nowak et al. | |
| 2013/0011243 | A1 | 1/2013 | Alajbegovic | |
| 2013/0049502 | A1 | 2/2013 | Gotoh | |
| 2013/0291539 | A1* | 11/2013 | Koch | F01D 17/24 |
| | | | | 60/602 |
| 2013/0327036 | A1* | 12/2013 | Bogner | F01D 17/105 |
| | | | | 60/600 |
| 2013/0340426 | A1 | 12/2013 | Bogner et al. | |
| 2014/0047832 | A1* | 2/2014 | Matthews | F02B 37/186 |
| | | | | 60/599 |
| 2017/0248070 | A1* | 8/2017 | Heddy, III | F02B 37/168 |

FOREIGN PATENT DOCUMENTS

| | | |
|---|---|---|
| DE | 10 2009 056 251 A1 | 6/2011 |
| DE | 10 2010 025 207 A1 | 12/2011 |
| DE | 10 2011 002 627 A1 | 7/2012 |
| DE | 11 2011 100 249 T5 | 11/2012 |
| DE | 10 2011 056 838 A1 | 6/2013 |
| DE | 11 2010 005 814 T5 | 6/2013 |
| JP | 2009-191707 A | 8/2009 |
| JP | 201 2241 61 * | 12/2012 |
| JP | 2012-241619 A | 12/2012 |
| WO | WO 2008/115773 A2 | 9/2008 |
| WO | WO 2009/090131 A1 | 7/2009 |
| WO | WO 2010/009945 A2 | 1/2010 |
| WO | WO 2010/123899 A1 | 10/2010 |
| WO | WO 2012/089459 A1 | 7/2012 |

* cited by examiner

TURBOCHARGER HAVING A WASTE-GATE VALVE

CROSS REFERENCE TO PRIOR APPLICATIONS

This application is a U.S. National Phase application under 35 U.S.C. § 371 of International Application No. PCT/EP2015/053497, filed on Feb. 19, 2015 and which claims benefit to German Patent Application No. 10 2014 106 513.1, filed on May 9, 2014. The International Application was published in German on Nov. 12, 2015 as WO 2015/169460 A1 under PCT Article 21(2).

FIELD

The present invention relates to a turbocharger having a waste gate valve, a compressor and a turbine, a turbine housing, a bypass channel for bypassing the turbine, a bypass channel section which is formed in the turbine housing, an actuator housing, an electromotor which is arranged in the actuator housing, a transmission which is arranged in the actuator housing, an output shaft of the transmission, and a control body which is coupled to the output shaft and an opening cross-section of the bypass channel.

BACKGROUND

Turbochargers with waste gate valves have previously been described. A turbocharger serves to increase the boost pressure and thereby the power of the internal combustion engine. The pressure that can be generated is always a function of the exhaust gas quantity conveyed because the turbine wheel is coupled with the compressor wheel. It is therefore necessary to reduce or control the drive power acting on the compressor under certain operating conditions.

Waste gate valves, among others, are used to achieve this, the waste gas valves being arranged in a bypass channel by which the turbine can be bypassed so that the turbine wheel is no longer acted upon by the entire flow quantity of the exhaust gas. These waste gate valves are most often designed as flap valves operated by a pneumatic actuator which drives a linkage coupled with the flap.

Since a high thermal load exists in the region of the turbine housing due to the hot exhaust gases, these pneumatic actuators have been arranged in the region of the compressor, and in particular at a distance from the turbine housing, in order to reduce thermal load.

An exact control of the exhaust gas quantity discharged via the bypass channel is, however, difficult to achieve with a pneumatic actuator. Electric motors have therefore seen widespread use as drives for waste gate valves in recent years. These were typically also arranged at a distance from the turbine housing to reduce thermal load so that linkages were still used for coupling with the flap.

An actuator of a waste gate valve is described in DE 10 2011 002 627 A1 whose electric motor is arranged coaxially to an output shaft on which a lever is mounted via which a linkage is operated, the linkage being operatively connected with a waste gate flap arranged in the turbine housing. To avoid an overheating of the actuator, the waste gas valve is positioned on the compressor housing in the region of the fresh air inlet duct to obtain a thermal coupling therewith.

Due to ever decreasing available installation space, it is desirable to arrange the actuators of the waste gate valves in the immediate proximity to the valve itself since the installation space necessary is thus reduced and a more precise control becomes possible. When linkages are used, an increased wear of the mechanical components, in particular due to increased transverse forces in the region of the flap bearings, as well as increased assembly efforts, often further occur.

WO 2012/089459 A1 therefore describes a turbocharger with a water-cooled turbine housing and an integrated electric waste gate valve. The housing in which the electric motor for driving the waste gate valve and the transmission are arranged is a part of the turbine housing in which corresponding cooling ducts are formed to carry water. The electric motor and the transmission are thus mounted on the turbine housing, wherein the necessary opening in the turbine housing is closed with a cover. The bearing of the valve is also arranged in the turbine housing.

A risk of a thermal overload of the actuator still exists when the proposed arrangement of the waste gate valve is used since the cooling medium is strongly heated while flowing through the turbine housing and is not effective immediately at the actuator. The actuator is also subjected to a direct thermal radiation from outside so that, under unfavorable conditions, a risk of overheating still exists.

SUMMARY

An aspect of the present invention is to provide a turbocharger with a waste gate valve where a thermal overload of the actuator drive is reliably prevented. An additional aspect of the present invention is for the waste gate valve to be easy to assemble, to require as little installation space as possible, and to provide a controllability which is as exact as possible.

In an embodiment, the present invention provides a turbocharger which comprises a waste gate valve, a compressor, a turbine, a turbine housing configured to house the turbine, a bypass channel configured to bypass the turbine, a bypass channel section arranged in the turbine housing, an actuator housing comprising a separate coolant channel, an electric motor arranged in the actuator housing, a transmission comprising an output shaft, a control body coupled to the output shaft, and an actuator cover. The transmission is arranged in the actuator housing. The actuator housing is configured to be detachably secured to the turbine housing. The control body is configured to control an opening cross-section of the bypass channel. The separate coolant channel of the actuator housing is configured to surround a circumference of the transmission and to be closed axially by the actuator cover.

BRIEF DESCRIPTION OF THE DRAWINGS

The present invention is described in greater detail below on the basis of embodiments and of the drawings in which.

DETAILED DESCRIPTION

Figure 1:
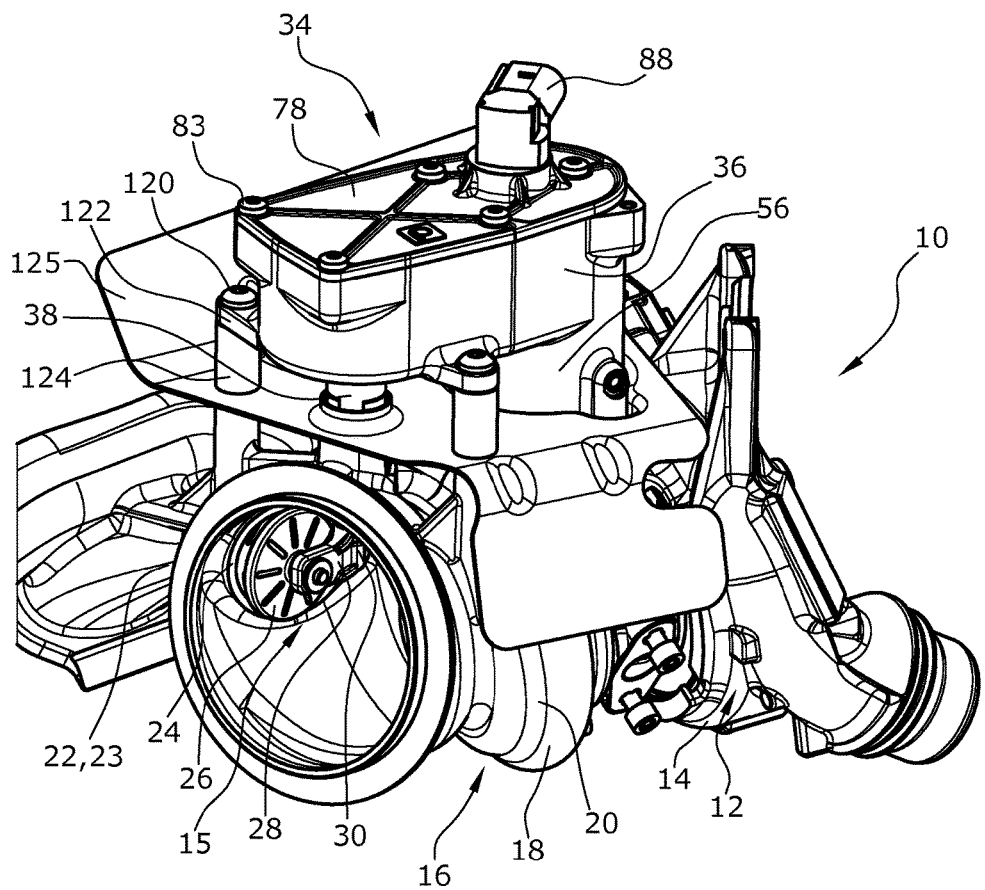
FIG. 1 shows a side view of a turbocharger of the present invention with a waste gate valve in perspective view.
Figure 2:
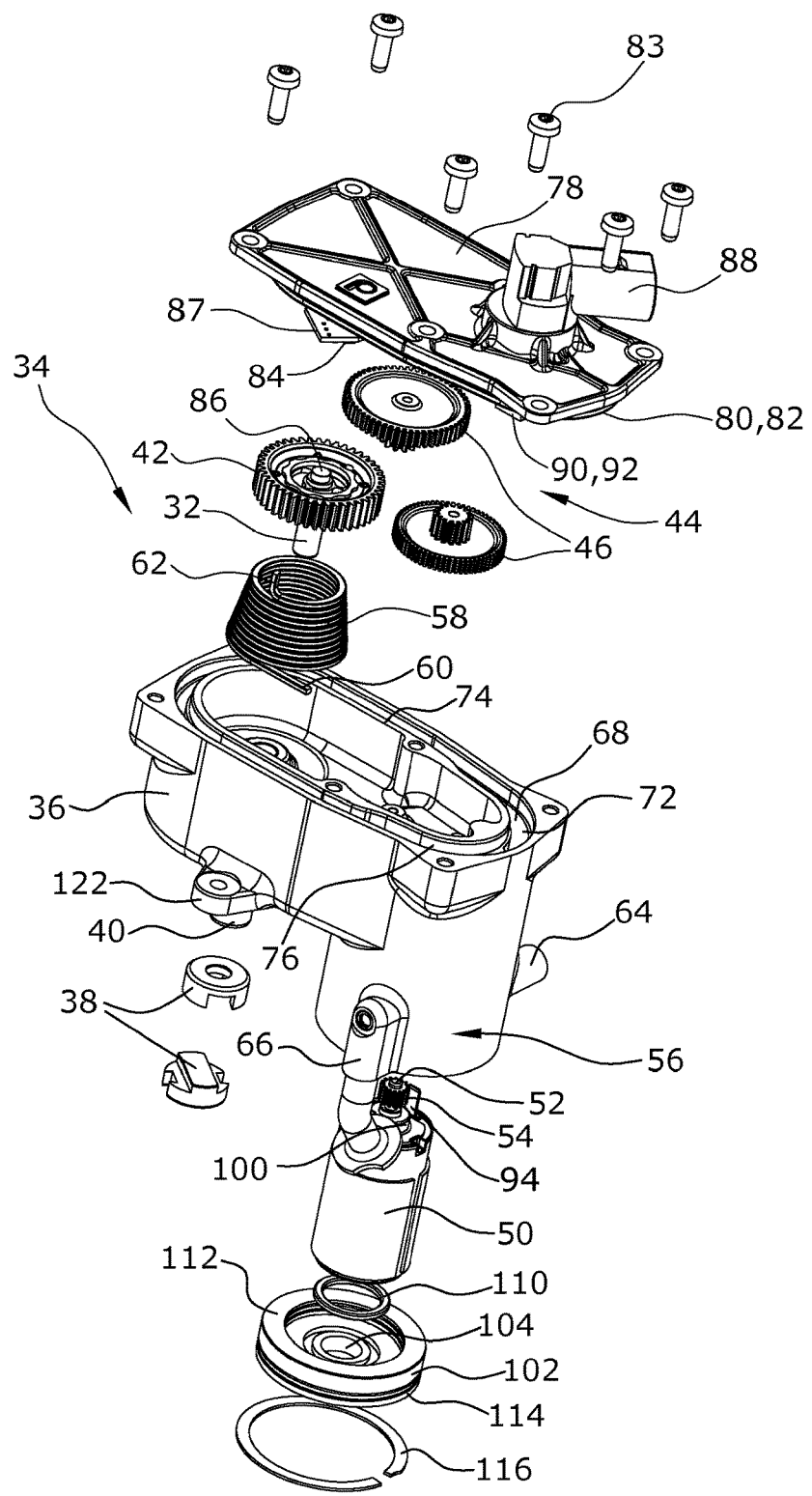
FIG. 2 shows an exploded perspective side view of an actuator housing of the waste gate valve in FIG. 1.

A separated coolant supply to the actuator is provided due to the fact that the actuator housing is detachably fastened on the turbine housing and has a separate coolant duct circumferentially surrounding the transmission and being closed with an actuator cover in the axial direction. The separated coolant supply can therefore be effected depending on the temperature actually prevailing in the actuator housing and independent of the temperature in the turbine housing.

The effect of heat radiation from the turbine is significantly reduced since the actuator housing is cooled directly. A thermal separation from the turbine housing exists despite the direct flap drive so that a very precise control of the waste gate valve becomes possible. Manufacture and assembly of the actuator are very simple despite the fact that the coolant duct is formed in the actuator housing since only a few components must be used. The load on the flap bearings is also very low.

In an embodiment of the present invention, electronic components of the waste gate valve can, for example, be arranged on the actuator cover so that additional mounted components which receive the electronics can be omitted. This additionally facilitates assembly.

In an embodiment of the present invention, a connector can, for example, be formed on the actuator cover. A sealing of a connector passage that would otherwise be required can be omitted. The actuator cover can be manufactured integrally with the necessary lines by injection molding. Assembly steps can thus be omitted that would otherwise be required to assemble the electronics in the housing.

In an embodiment of the present invention, a contactless sensor for position feedback can, for example, be fastened to the actuator cover, which sensor communicates with a magnet connected with the output shaft, i.e., either directly on the output shaft or indirectly on a component connected for rotation with the output shaft, such as the output gear.

Further simplification is achieved if the terminals for the electric motor are formed on the actuator cover so that an electric contacting of the electric motor is effected automatically when placing the cover. All live lines can correspondingly be formed on the cover or be molded therein.

To achieve a particularly good cooling of the thermally sensitive electric motor and, correspondingly, to dissipate sufficient heat, the coolant duct encloses the electric motor radially, at least in part, over the entire axial height. The heat from the electric motor can thus be guided to the outside and a thermal separation from the possibly hot surroundings of the actuator is provided. Thermal overload can thereby be reliably avoided.

In an embodiment of the present invention, a coolant inlet port and a coolant outlet port can, for example, be formed on the actuator housing in a receiving portion of the electric motor. An independent cooling circuit for the waste gate actuator can be connected via these ports. An exact temperature control is thereby possible.

To be able to also use a simple manufacture in a die casting process, the coolant duct surrounding the electric motor is closed axially by a motor cover. The duct can thus be formed using slide gates so that no lost cores must be used.

In an embodiment of the present invention, the coolant duct can, for example, be interrupted in the circumferential direction by a partition wall arranged between the coolant inlet port and the coolant outlet port and extending axially over the entire height of the coolant duct. A short circuit flow from the inlet port to the outlet port is thereby prevented. A forced flow around the entire transmission and the electric motor and thus a cooling over the entire circumference is instead provided.

The installation space required can be reduced significantly if the electric motor is arranged to be axially parallel to the output shaft and if the receiving portion of the electric motor extends in the direction of the turbine housing.

In an embodiment of the present invention, the control body can, for example, be connected to rotate with the output shaft. This fastening may either be a direct fasting on the shaft or be achieved via a lever extending from the shaft and engaging the control body. Such a design reduces the assembly effort and allows for a very exact controllability.

In an embodiment of the present invention, the control body can, for example, be coupled with a flap shaft having a common axis of rotation with the output shaft. The good controllability is thereby maintained while a thermal separation or isolation can be used to reduce the heat transported into the actuator via the shaft.

This may be effected, for example, by coupling the flap shaft with the output shaft via an Oldham coupling that provides a direct rotational coupling and, due to the reduced contact surfaces, reduces heat transport. This coupling can also be made from a material with low thermal conductivity, such as ceramics.

A turbocharger with a waste gate valve is accordingly provided that is reliably protected from thermal overload and which may be mounted to the turbocharger as a preassembled component so that assembly is facilitated while at the same time making a very precise control of the waste gate valve possible. The cooling can be adapted separately to the requirements of the turbine and the valve. Necessary installation space is significantly reduced compared to known designs.

An embodiment of a turbocharger of the present invention with a waste gate valve is illustrated in the drawings and will be described hereunder.

The turbocharger 10 illustrated in FIG. 1 comprises a compressor 12 with a compressor wheel arranged in a compressor housing 14, and a turbine 16 with a turbine wheel arranged in a turbine housing 18. The turbine wheel is fastened in a manner known per se on a common shaft with the compressor wheel so that the movement of the turbine wheel caused by an exhaust gas flow in the turbine housing 18 is transmitted to the compressor wheel via the shaft, whereby an airflow is compressed in the compressor housing 14.

A bypass channel 22 branches off in the turbine housing 18 upstream of the spiral duct 20 surrounding the turbine wheel, the opening cross section of the bypass channel 22 being controllable by a waste gate valve 15. The bypass channel 22 opens into the subsequent exhaust gas duct of the internal combustion engine behind the spiral duct 20.

A valve seat 24 that surrounds an opening cross section of the bypass channel 22 is situated in a bypass channel section 23 formed in the turbine housing 18. The opening cross section is controllable by a control body 26 of the waste gate valve 15 in the form of a flap, which may be placed on the valve seat 24 to close the opening cross section and which may be lifted off the valve seat 24 to open the flow cross section of the bypass channel 22.

For this purpose, the control body 26 is fastened to a lever 28 that extends from a flap shaft 30 and is integrally formed therewith. The flap shaft 30 has the same axis of rotation as the output shaft 32 of an actuator 34 via which the control body 26 is operated. The output shaft 32 extends out of an actuator housing 36 towards the turbine housing 18 and is connected for rotation with the flap shaft 30 by an Oldham coupling 38.

Figure 3:
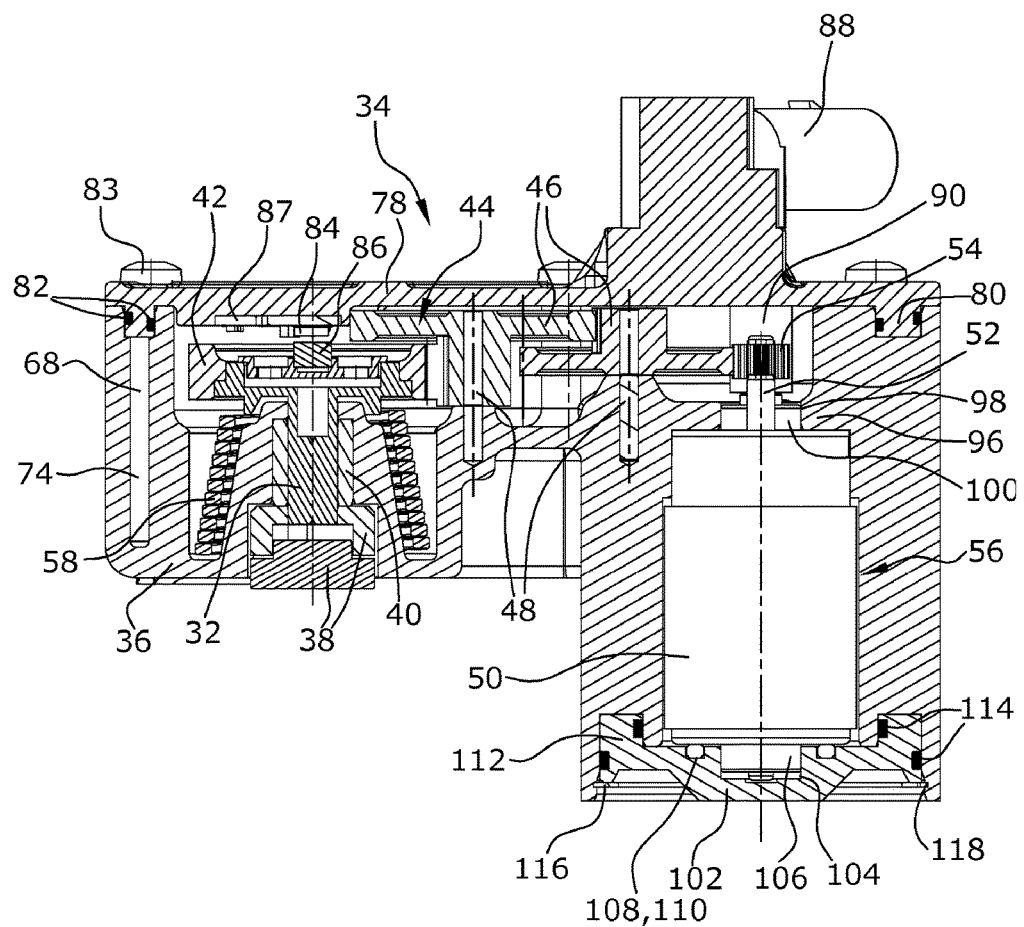
FIG. 3 shows a sectional side view of the actuator housing of the waste gate valve in FIG. 1.

As can in particular be seen in FIG. 3, a bearing 40 supports the output shaft 32 in the actuator housing 36 which is formed as an integral die-cast part. An output gear 42 of a transmission 44, which is designed as a spur gear transmission, is arranged on the output shaft 32. The transmission 44 is arranged inside the actuator housing 36 and the gears 46 thereof are supported on axles 48 mounted in the actuator housing 36.

The gears 42, 46 of the transmission 44 are driven by an electric motor 50 on the drive shaft 52 of which a drive pinion 54 is arranged that meshes with the next transmission stage of the transmission 44. The electric motor 50 is arranged in a receiving portion 56 of the actuator housing 36 so that the electric 50 motor extends axially parallel to the output shaft 32 in the direction of the turbine housing 18 of the turbocharger 10.

A return spring 58 is additionally arranged in the actuator housing 36, which return spring 58 surrounds the output shaft 32 and has one end leg 60 rest on an abutment in the actuator housing 36, while the other end leg 62 engages into the output gear 42 so that, in the event of a failure of the electric motor 50 or other malfunction, the output shaft 32, and thus the control body 26, is rotated into a fail-safe position so as to avoid damage to the turbocharger 10.

Figure 4:
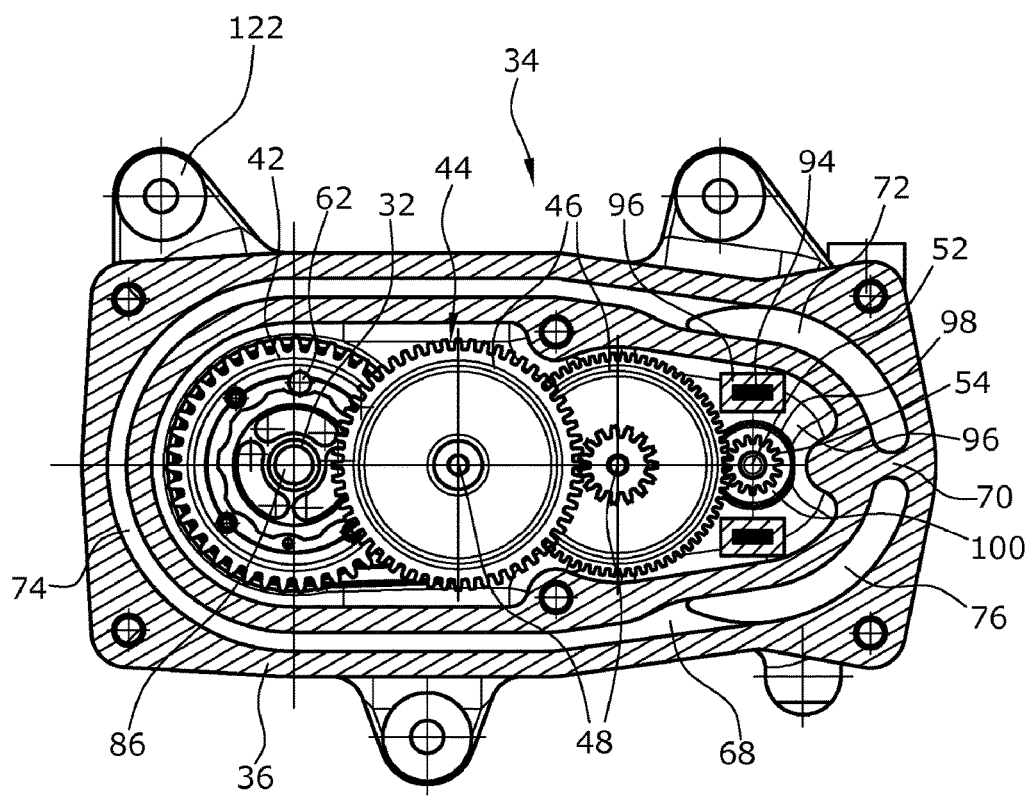
FIG. 4 shows a top view of the actuator housing of the waste gate valve illustrated in section.

At the receiving portion 56 of the electric motor 50, a coolant inlet port 64 and a coolant outlet port 66 are formed on the actuator housing 36, which are connected with a coolant duct 68 formed in the actuator housing 36. As can be seen in FIG. 4, this coolant duct 68 extends circumferentially all around the transmission 44 and also substantially over the entire axial height of the actuator housing 36 except for a partition wall 70 formed in the axial direction between the coolant inlet port 64 and the coolant outlet port 66. The coolant duct 68 has three sections. The coolant flows into the first section 72 via the coolant inlet port 64 and flows around a first side of the receiving portion 56 of the electric motor 50. This first section 72 extends substantially over the entire axial height of the electric motor 50 and surrounds the electric motor 50 over an angular range of about 60°. The coolant flows axially in the direction of the transmission 44 into a second section 74 which surrounds the portion of the actuator housing 36 receiving the transmission 44 on three sides and extends only over the axial height thereof. The coolant flows then into a third section 76 formed asymmetrically relative to the first section 72 and correspondingly extending axially to the coolant outlet port 66 on an opposite side of the electric motor 50. The first section 72 and the third section 76 are separated from each other by the partition wall 70 that extends over the entire height of the coolant duct 68 so that a short-circuit flow from the coolant inlet port 64 to the coolant outlet port 66 is prevented and a forced flow around the actuator 34 is provided.

The coolant duct 68 as well as the interior of the actuator housing 36 is closed by an actuator cover 78. The actuator cover 78 is in particular made by a plastics injection molding. For a tight closure of the coolant duct 68, a circumferential projection 80 is formed on the actuator cover 78 on the side facing the actuator housing 36, the circumferential projection 80 corresponding to the shape of the coolant duct 68 and having the width thereof so that the circumferential projection 80 protrudes into the recess in the actuator housing 36 serving as the coolant duct 68. On its opposite sides, seen in cross section, a respective seal 82 is formed extending circumferentially with the circumferential projection 80, the seal 82 providing a tight closure of the coolant duct 68.

Besides its function as a closure for the actuator housing 36, the actuator cover 78, which is fastened to the actuator housing 36 by screws 83, also serves as a carrier for electric components of the actuator 34. The side of the actuator cover 78 directed towards the interior of the actuator 34 is accordingly provided with a Hall sensor 84 for providing a position feedback, the Hass sensor 84 communicating with a magnet 86 arranged on the end of the output shaft 32. A circuit board 87 that may include control elements of the actuator 34 is also formed on this side of the actuator cover 78. The circuit board 87 and the Hall sensor 84 are connected with a connector 88 via invisible lines molded in the actuator cover 78, the connector 88 being made integrally with the actuator cover 78 and extending outward. Two projections 90 additionally extend towards the electric motor 50 on the side of the actuator cover 78 opposite the connector 88 in which terminals 92 are formed via which the contact tabs 94 of the electric motor 50 are connected for power supply to the electric motor 50.

As can be seen in FIG. 3, the electric motor 50 is pushed from the side axially opposite the actuator cover 78 into the receiving portion 56 against an abutment portion 96 of the actuator housing 36. This abutment portion 96 has an opening 98 for receiving the A-bearing 100 of the electric motor 50 through which the drive pinion 54 protrudes towards the transmission 44. Two openings are additionally formed at the abutment portion 96 through which the contact tabs 94 of the electric motor 50 extend into the projections 90 of the actuator cover 78.

On the side axially opposite the actuator cover 78, the receiving portion 56 of the electric motor 50 is closed with a motor cover 102 that simultaneously closes the first section 72 and the third section 76 of the coolant duct 68. The motor cover 102 has a recess 104 for receiving a B-bearing 106 of the electric motor 50 as well as a circumferential groove 108 into which a corrugated spring 110 is placed to pre-tension the electric motor 50 in the axial direction. Similar to the actuator cover 78, the motor cover 102 is further formed with a circumferential projection 112 with, as seen in cross section, opposite ring seals 114, the circumferential projection 112 extending into the cooling duct 68 and sealing the cooling duct 68 to the outside. The motor cover 102 is fastened by a clamping ring 116 which, in the assembled state, is retained in a radial groove 118 at the axial end of the receiving portion 56 of the actuating housing 36.

The actuator 34 is fastened to the turbine housing 18 by screws 120 inserted through eyelets 122 formed at the sides of the actuator housing 36 and threaded into domes 124 with female threads formed on the turbine housing 18. A heat dissipation sheet 125 is provided between the actuator 34 and the turbine housing 18 to provide additional shielding of the turbine housing 18 from heat radiation.

The waste gate valve described thus has a cooling circuit of its own that makes it possible to control the temperature in the housing of the waste gate valve separately, i.e., independent of the turbine housing of the turbocharger. The actuator of the waste gate valve may be preassembled and thereafter mounted on the turbine housing so that a direct connection of the actuator to the valve is obtained, whereby a very precise control becomes possible. A long service life is achieved due to the good thermal decoupling of the actuator from the turbine housing and, as a consequence thereof, the low thermal load on the electric motor and on the other electronic components. Assembly is greatly simplified since all electronic components are formed on the actuator cover and are thus mounted together with the actuator cover which, however, at the same time closes the coolant duct. The number of the components that are present and have to be mounted is thereby reduced.

It should be clear that the present invention is not restricted to the embodiments described herein, but that various modifications are possible within the scope of protection of the main claim. It is in particular possible to fasten the covers in a different manner or to use axial seals. It is also conceivable to use a continuous shaft with poor thermal conductivity. Reference should also be had to the appended claims.

What is claimed is:

1. A turbocharger comprising:
    a waste gate valve;
    a compressor;
    a turbine;
    a turbine housing configured to house the turbine;
    a bypass channel comprising an opening cross-section, the bypass channel being configured to bypass the turbine;
    a bypass channel section arranged in the turbine housing;
    an actuator housing comprising a separate coolant channel, the actuator housing being configured to be detachably secured to the turbine housing;
    an electric motor arranged in the actuator housing;
    a transmission comprising an output shaft, the transmission being arranged in the actuator housing;
    a control body coupled to the output shaft, the control body being configured to control the opening cross-section of the bypass channel; and
    an actuator cover;
    wherein,
    the separate coolant channel of the actuator housing is configured to surround a circumference of the transmission and to be closed axially by the actuator cover.

2. The turbocharger as recited in claim 1, wherein the waste gate valve comprises electronic components which are arranged on the actuator cover.

3. The turbocharger as recited in claim 1, wherein the actuator cover comprises a connector formed thereon.

4. The turbocharger as recited in claim 1, further comprising:
    a magnet connected with the output shaft; and
    a contactless sensor fastened on the actuator cover, the contactless sensor being configured to provide a position feedback and to communicate with the magnet.

5. The turbocharger as recited in claim 1, further comprising:
    terminals for the electric motor, the terminals being formed on the actuator cover.

6. The turbocharger as recited in claim 1, wherein the separate coolant channel is further configured to radially surround the electric motor at least in part over an entire axial height of the electric motor.

7. The turbocharger as recited in claim 6:
    the electric motor comprises a receiving portion, and further comprising:
    a coolant inlet port formed on the actuator housing and in the receiving portion of the electric motor; and
    a coolant outlet port formed on the actuator housing and in the receiving portion of the electric motor.

8. The turbocharger as recited in claim 7, further comprising:
    a motor cover configured to axially close the separate coolant channel surrounding the electric motor.

9. The turbocharger as recited in claim 7, further comprising:
    a partition wall arranged between the coolant inlet port and the coolant outlet port, the partition wall being configured to extend axially over an entire height of the separate coolant channel and to interrupt the separate coolant channel in a circumferential direction.

10. The turbocharger as recited in claim 7, wherein,
    the electric motor is arranged axially parallel to the output shaft, and
    the receiving portion of the electric motor is configured to extend in a direction of the turbine housing.

11. The turbocharger as recited in claim 1, wherein the control body is connected to rotate with the output shaft.

12. The turbocharger as recited in claim 1, further comprising:
    a flap shaft comprising a common axis of rotation with the output shaft,
    wherein,
    the control body is coupled with the flap shaft.

13. The turbocharger as recited in claim 12, further comprising:
    an Oldham coupling,
    wherein the flap shaft is coupled with the output shaft via the Oldham coupling.

* * * * *